April 11, 1939.  R. R. MOORE  2,154,277
MATERIAL TESTING MACHINE
Filed March 11, 1937  3 Sheets-Sheet 2
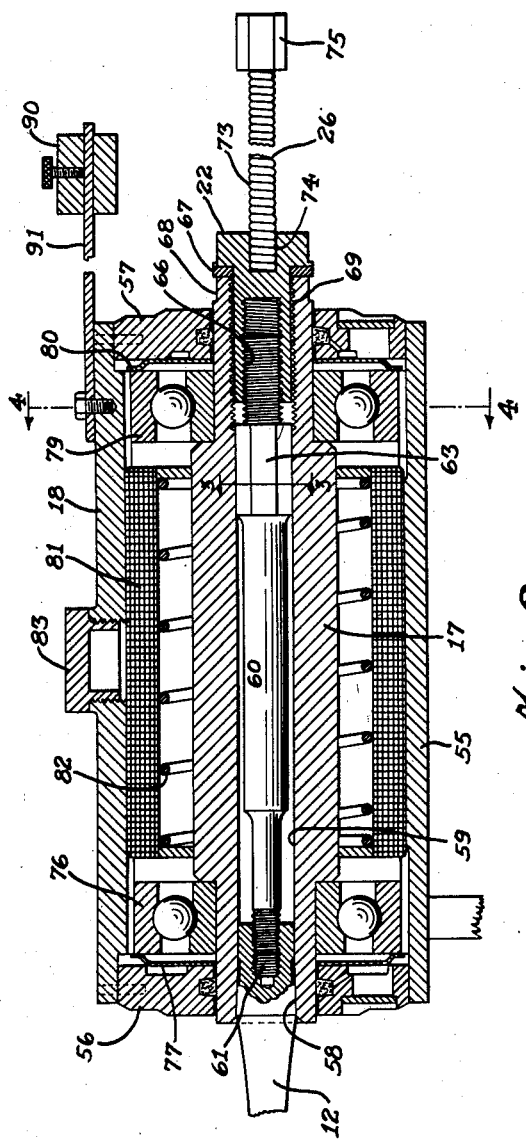
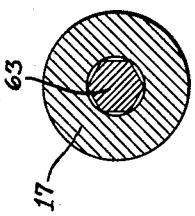
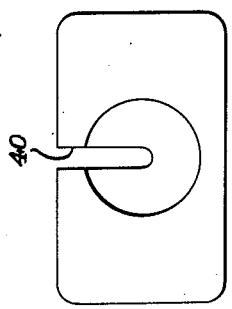
INVENTOR
Richard R. Moore
BY
Marechal & Noé
ATTORNEY April 11, 1939.  R. R. MOORE  2,154,277
MATERIAL TESTING MACHINE
Filed March 11, 1937   3 Sheets-Sheet 3
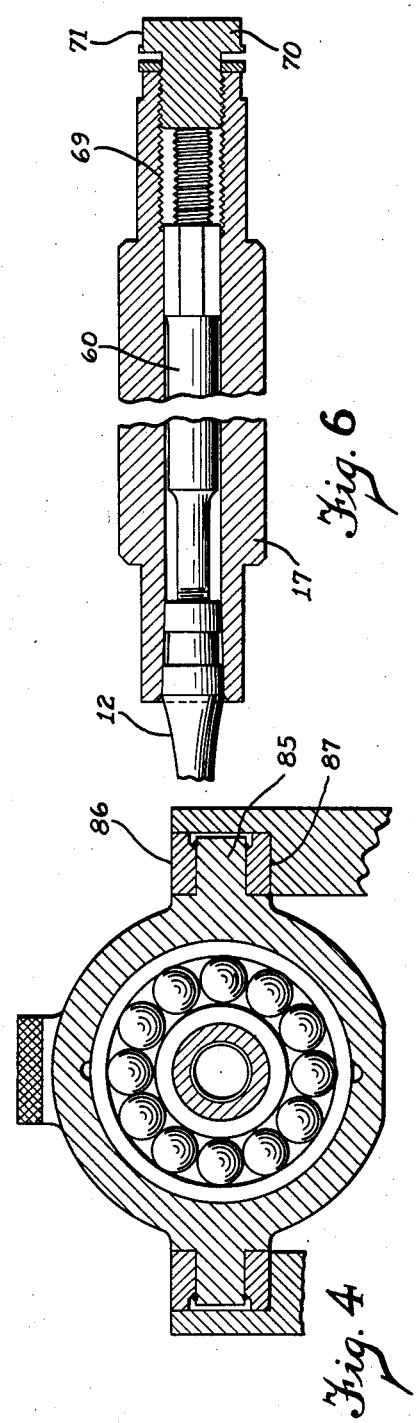
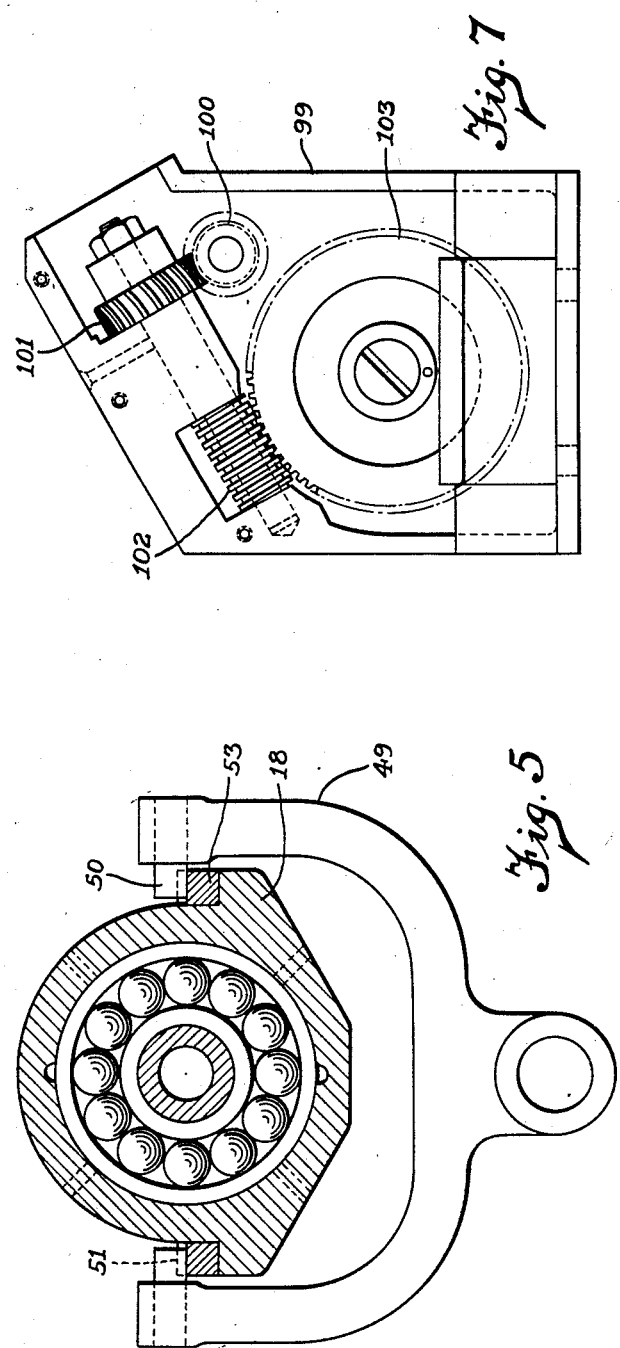
INVENTOR
Richard R. Moore
BY Marechal & Noe
ATTORNEY Patented Apr. 11, 1939

2,154,277

UNITED STATES PATENT OFFICE 2,154,277

MATERIAL TESTING MACHINE

Richard R. Moore, Lansdowne, Pa.

Application March 11, 1937, Serial No. 130,350

5 Claims. (Cl. 265—13)

This invention relates to material testing machines and more particularly to machines for testing metal specimens for fatigue.

One object of the invention is the provision of a material testing machine in which specimens are subjected to alternating stresses of tension and compression as the specimen is rotated, the machine being especially designed for operation at unusually high speeds in a noiseless and substantially frictionless manner.

Another object of the invention is the provision of a material testing machine of the character mentioned, in which the specimen is tested as a simple beam loaded at two points, the machine comprising spindle housings which support spindles that are adapted to receive the conically tapered ends of the specimen. The spindles are rotatably mounted by means of anti-friction bearings arranged substantially coincident with the transverse planes containing the point of application of the load to the housings and containing the pivot axes of the housings where they are supported on a common base.

Another object of the invention is the provision of a material testing machine of the character mentioned having a driving connection between the motor and the adjacent end of a spindle, the connection being such that a tight and frictionless driving connection is obtained and insured in spite of the tremor of very high speed operation, the driving connection being such as to transfer the force axially to the specimen.

Another object of the invention is the provision of a material testing machine of the dead weight type, adapted for high speed operation, in which the spindle housings and the driving motor are arranged on top of the upper wall of a hollow base, the latter having a comparatively shallow weight receiving chamber so that the entire testing machine can be supported as a unit on the top of a bench or table or the like.

Other objects and advanages will be more apparent from the following description, the appended claims and the accompanying drawings, in which—

Fig. 2 is a central vertical section through one of the journal housings and through a portion of a specimen and a portion of the driving means;

Fig. 3 is a section on the line 3—3 of Fig. 2;

Fig. 4 is a section on the line 4—4 of Fig. 2;

Fig. 5 is a section on the line 5—5 of Fig. 1;

Fig. 6 is a section through the driving spindle showing how the specimen is removed;

Fig. 7 is a transverse section on the line 7—7 of Fig. 1 through the revolution counter; and Fig. 8 is a small scale view of one of the weights.

Figure 1:
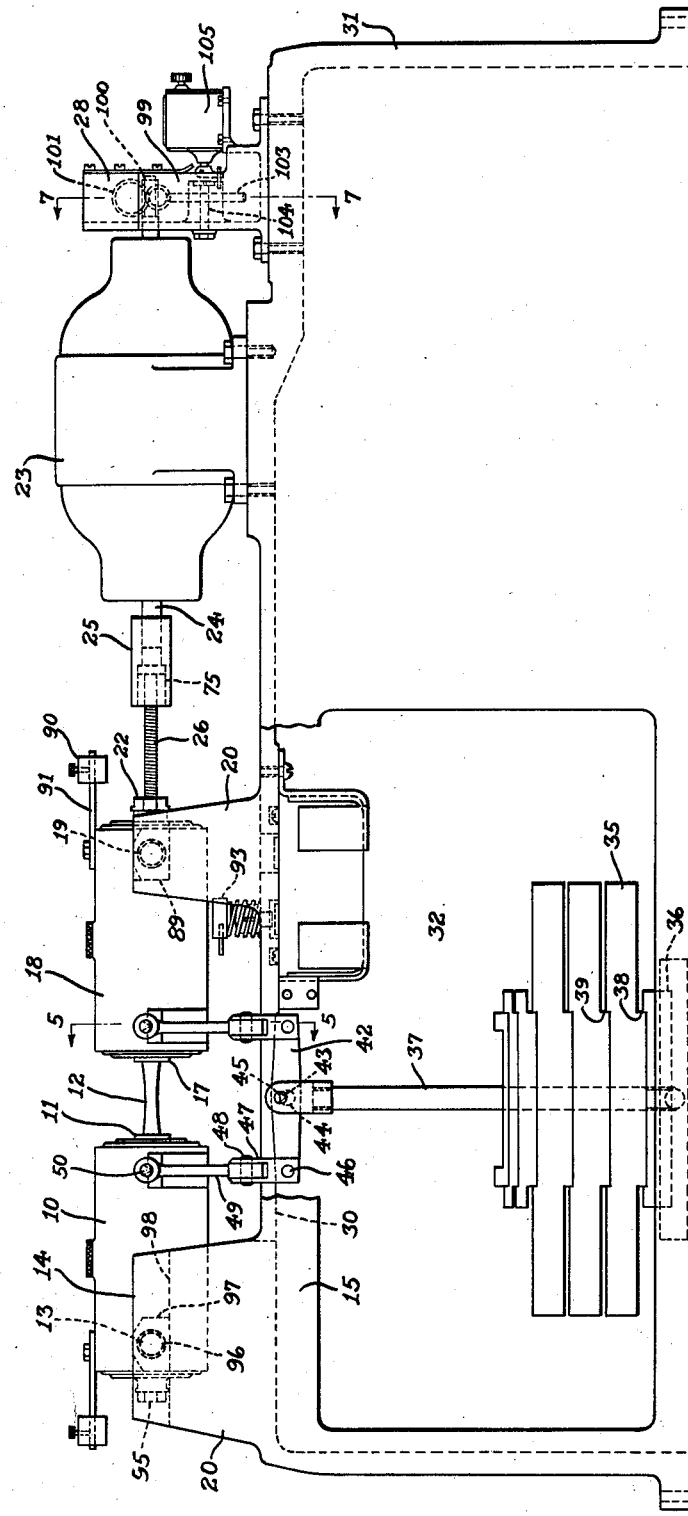
Fig. 1 is a side elevation of material testing machine embodying the present invention.

Referring more particularly to the drawings by reference numerals, the material testing machine is one adapted for fatigue testing of material specimens. The specimens are subjected to a bending load and at the same time they are rotated rapidly. The load is applied to two housings in which the spindles that are connected to the specimen are rotatably mounted. The load is applied as a simple beam loaded at two points, and preferably between the points of support of the housings on a base member. The number of rotations, indicated by a revolution counter, together with the amount of the bending stresses to which the specimen has been subjected, are considered in determining the ability of the material to withstand fatigue.

In accordance with the present invention, the material testing machine comprises a spindle housing 10 rotatably supporting a spindle 11 which is connected to one end of a specimen 12. The spindle housing 10 is supported for tilting or rocking movement on a transverse axis 13, the housing having projecting portions suitably mounted on opposed standards or pedestals 14 which are arranged on a common supporting base 15 as will be more fully set forth. The opposite end of the specimen 12 is secured to a spindle 17 which is rotatably mounted in a second spindle housing 18. The latter is adapted for tilting movement about a transverse axis 19, being supported at opposite sides on the standards or pedestals 20 which also extend upwardly from the base 15. The right-hand end of this spindle, as viewed in Fig. 1, is rotated by a driving member 22 which is operated by an electric motor 23, the latter having a shaft 24 which is connected through coupling 25 and through flexible shaft 26 so that the spindle, and the specimen, will be rotated in timed relation by the motor. The motor 23 also directly operates a tachometer or revolution counter 28 which is supported on the base 15 as shown in Fig. 1.

The various parts mentioned, as will now be apparent, are all arranged on the upper wall 30 of the base 15. Extending down from the upper wall 30 are side walls 31 providing a partial enclosure for a weight chamber 32 in which the weights 35 are supported. The weight chamber 32 is of comparatively small height as compared to its length so that the total height of the machine is not excessive, and since the weights are contained entirely within the chamber 32 it is apparent that the machine is a self-contained unit adapted to be set upon a bench or table or the like and to require no special foundation provision with special adaptation for the depending weights. The weights employed with the machine described are rather long weight members, of comparatively small height, and adapted to be stacked one upon the other on a hanger including rod 37 which is connected to the adjacent ends of the two spindle housings to apply equal loads to the housings, the load of course being determined by the number of weights employed. The lower weight 35 rests on the bottom plate 36 of the weight hanger, this plate being suitably secured to the upwardly extending load supporting rod 37. The plate 36 has a cylindrical depression 38 which receives the lower end of the lower weight 35. Each weight is thus provided with a correspondingly shaped depression 39, similar to the depression 38 in the plate 36, so that the various weights are centered one on the other and are applied merely by lateral movement so that the rod 37 is received in the radial slot 40 of the weight, see Fig. 8.

The upper end of the rod 37 is attached to a yoke 42, the latter having V-shaped notches 43, provided on oppositely projecting studs 44. The upper end of the rod 37 is provided with V-shaped points 45 resting on the notches 43 so that the load is exactly applied to the center of the yoke 42 without producing any tilting or lateral force component. The opposite ends of the yoke 42 are pivotally connected as indicated at 46 to attachment members 47 which, in turn, are connected by pins 48 to the downwardly extending end of members 49. These members 49 are connected to the members 47 so that the load is equally and exactly divided on the opposite sides of each housing 10 and 18 and is exactly divided between the two housings. The load is applied to the housings by V-shaped projections 50 on the upper ends of the members 49, the projections 50 seating in V-shaped notches 51 which are provided in the blocks 53. The latter are screwed or otherwise secured to opposite sides of the housing 18 as indicated in Fig. 5. The connection between the members 49 is similar for both of the housings.

The housing 18, as shown in Fig. 2, comprises a barrel 55, preferably of cast iron, and preferably in the form of a continuous shell, closed at one end by the end plate 56, and at the other by the end plate 57. The two end plates preferably have a forced fit in the ends of the barrel 55. Rotatably supported within the spindle housing 18 is the spindle 17 which, at one end, is provided with a conical seat 58 of some suitable taper, adapted to receive the tapered end of the specimen 12. The spindle 17 has a central passage 59 which receives the draw bar 60, one end of which is threaded as at 61, for threaded engagement with the end of the specimen 12. The draw bar has a non-circular portion 63 which is received loosely in a non-circular portion of corresponding shape in the spindle 17. As shown these portions are of hexagonal cross section, as indicated in Fig. 3. The adjacent circular portion of the draw bar is of a diameter preferably somewhat less than the distance between the flats of the hexagon sides so that the draw bar can, if desired, be removed from or applied at either end of the spindle. However, relative rotational movement of the draw bar and spindle are normally prevented. With the draw bar screwed into the end of the specimen, it will be apparent that the specimen can be pulled tight, without turning the specimen in the conical seat 58, merely by pulling to the right on the bar 60. This is accomplished by the drive member 22 which is provided with interior threads 66. The latter receive the threads on the right-hand end of the draw bar, and by turning the drive member 22 and screwing up on the threads on the draw bar it will be apparent that the latter can be pulled to the right so as to firmly seat the specimen in the spindle when the drive member 22 bears tightly against the washer 67 on the end of the spindle, in the position as indicated in Fig. 2. The spindle itself may be held against rotation by a wrench in engagement with the hexagonal end portion 68 of the spindle where the latter projects beyond the end plate 57. The motor turns in such direction as to tend to tighten the various threaded connections.

As will be noted, the length of the draw bar is such that its end is within the spindle, and preferably lies inwardly of at least some of the internal threads 69 with which the spindle is provided, as shown in Fig. 6. These threads are not effective as securing means when the specimen is mounted in position but the edges of the threads act to center the drive member 22 accurately with respect to the spindle, the looseness or play between the spindle and the hexagonal part 63 of the draw bar allowing the draw bar to accommodate itself to the centered position of the drive member. These threads 69 are also employed to readily loosen the specimen from the spindle. This loosening action may be accomplished without hammering or jarring the spindle, or the specimen, by a screw plug 70 which can be threaded into the spindle after removing the drive member 22. The screw plug 70 has a hexagonal portion 71 adapted to be operated by a wrench so that it may be screwed into the threads 69 of the spindle until the end of the plug engages the end of the draw bar 60. Further inward movement of the screw plug forces the draw bar and the specimen to the left and frees the specimen from the spindle. The screw plug can then be removed and the draw bar taken out from the spindle, as by moving the same toward the left as viewed in Fig. 2. This operation, as will be apparent, is effected without jarring or hammering the accurately fitting parts of the machine.

The draw bar and the spindle are driven from the drive member 22 so that the specimen will be turned in accordance with the revolution of the motor shaft. To effect the drive of the specimen without producing undesirable vibration and wear which would otherwise be obtained at high speed operation, the drive member 22 is integrally connected to a flexible shaft 26. One end of this shaft, as shown in Fig. 2, is sweated or brazed in a bore or socket 74 provided centrally in the drive member 22 so that the flexible shaft 26 is in alignment with the spindle 17. Moreover the connection between the flexible shaft 26 and the spindle is quite close to the end of the housing as will be quite apparent from Fig. 1. The other end of the flexible shaft is sweated or secured to a knuckle 75 which is axially slidable within the coupling 25 but which is flattened on one side or is of other non-circular cross section so it is compelled to rotate with the coupling. The latter is fixed as by means of suitable pin to the shaft 24 of the motor. The connection by the flexible shaft 26 between the motor shaft and the drive member 22 is one in which there can be no relative movement between the various parts during operation so that no wear or vibration can obtain even under conditions of high speed operation. The drive is therefore smoothly imparted between the motor and the spindle.

The spindle is rotatably mounted in the spindle housing 18 by means of a pair of spaced antifriction bearings, preferably incorporating inner and outer races and a series of balls or the like operable in the races. One antifriction bearing, as indicated at 76, is provided closely adjacent the end wall 56 of the housing, a suitable spring member 77 being interposed between the end wall 56 and the outer race of the ball bearing 76. The inner race of the ball bearing has a push fit on the end of the spindle, and engages a shoulder on the spindle as shown in Fig. 2. At the opposite end of the housing is a second ball bearing 79, yieldingly spaced as by means of a spring plate 80 from the housing end wall 57. Between the two antifriction bearings is a quantity of absorbent material 81 capable of retaining quantities of oil or similar lubricant material. A coil spring 82 holds the absorbent material away from the spindle. During operation, the oil, which may be supplied through a filler cap 83, filters through the absorbent material 81 and is supplied in suitable quantities to the antifriction bearings.

The spring plate 80 holds the outer races of the antifriction bearings yieldingly so as to take up any play that may be present between the bearings and the end plates of the housing 18.

The location of the bearing 76 is such as to correspond with the point of application of the load on the housing. As shown in Fig. 5, the geometric plane extending transversely through the housing 18 at the point of application of the load also extends centrally through the ball bearing 76. The opposite end of the spindle is also supported by its bearing at a point contained in the plane passing through the axis of pivotal movement of the housing on the base. The spindle is thus rotatably supported on the housing so that any bending stresses that would otherwise be applied to the housing are entirely eliminated. There is therefore no deflection of the housing, and consequently high speed operation of the spindle can take place without producing bending strains on the housing, and without producing housing deflections. As will be apparent from Fig. 2, as already mentioned, the point of application of the driving load to the driving member 22 is quite close to the ball bearing 79, where the spindle is mounted on the housing, so that the vibration tendencies due to the fact that a projecting part of the spindle is driven, are very small.

The pivotal connection between the housing 18 and the pedestals or supports 20 is one which is especially effective in reducing vibration under high speed conditions. The cast iron barrel 55 of the housing is provided with integral cast iron journals 85 so that it will be impossible for any relative movement to obtain between the journals 85 and the housing itself. Surrounding each of the journals 85 is a bearing member 86, preferably of bronze and having a running fit with the cylindrical surface of the journal. The bronze bearing members 86 are of rectangular form, having a lower flat surface 87 which rests on a seat or shelf provided by the respective supporting pedestals 20. These pedestals have portions that extend upwardly adjacent opposite ends of the bearing member 86 so that the vertically extending flat surfaces 89 of the bearing member are guided vertically with a snug fit sufficient to eliminate any substantial movement but giving sufficient flexibility so that the housing can pivot in a vertical plane. The housing 18 is thus held against any relative shifting in an axial direction during operation. It will be obvious that the load on the spindle produces a lowering of the overhanging ends of the spindles that are secured to the specimen to a degree according to the amount of the load applied.

To counterbalance the weight of the overhanging portion of the housing and its contained parts, a means such as a weight 90 adjustably provided on a bar 91 is secured to each housing, the weight being sufficient to provide for operation of the spindle at zero load by overcoming the unbalanced weight of the housing and its parts.

Below the housing 18 is a switch 93 which interrupts the motor energizing circuit as soon as the housing falls after the specimen is broken.

The housing 19 which supports the spindle 11 connected to the other end of the specimen, is the same, in construction, as the housing 18. The antifriction bearings provided in the housing 19 for the support of the spindle 11 are arranged in the same transverse planes which contain the pivot axis 13 and the point of load application. The specimen is attached in the same way to the spindle 11 as to the spindle 17, the spindle arrangement being the same as that illustrated in Fig. 2 except that the driven member 95 is without a driving flexible shaft 26. There is this other difference in the mounting of the housing 19; the integrally provided cast iron bushings 96 on the housing 19 have a running fit with blocks 97, one on each side of the housing 19, and these blocks are slidably mounted on horizontal slide surfaces 98 provided on the supports 20. The blocks 97 can move freely along the supporting surfaces 98 in a longitudinal direction to provide for any bending that may be present in the specimen, and permitting the use of specimens of different lengths.

The tachometer or revolution counter is driven directly by the motor 23 so that the power required for the operation of this revolution counter is not transmitted through the specimen itself. The specimen itself is therefore practically free from any force transmission, as the spindle 11 is supported for substantially frictionless movement in the housing 19. Any breakdown of the specimen can thus be attributed to the fatigue factor. The tachometer 28 preferably comprises a casing 99 surrounding a worm 100 provided on the projecting end of the motor shaft 24. This worm engages a worm wheel 101 and the latter is fixed to a worm 102 engaging a worm wheel 103. The latter is mounted on a slow speed shaft 104 which operates the tachometer unit contained in the counter 105.

As will now be apparent, the machine is one in which vibration is effectively reduced and substantially eliminated. The slight tremor which very high speed operation may produce will be diminished so that it has a negligible effect on the test results and a negligible effect on the life of the machine and its satisfactory operation. The specimen can thus be operated up to and even in excess of speeds of 10,000 R. P. M. At these extremely high speeds the driving force can be transmitted through the flexible drive shaft 26 and the power thus imparted to the spindle and to the specimen without passing through any jointed connections in which wear and vibration can obtain. The spindles are supported adequately and in a frictionless manner in the housings and are supported by the bearings at points coincident with the plane in which the load is applied and in the plane containing the pivot axis. Each housing itself is thus kept free from bending loads and deflections. The specimen can be quickly applied and removed, all without jarring the accurately made parts of the mechanism. And even at unusually high speeds of operation, since the weight is a dead weight load and is adequately and equally divided on opposite sides of the housings and between the two housings, the tests of a specimen loaded as a simple beam with the load application at two points will be extremely reliable and accurate.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A material testing machine comprising a base, a plurality of aligned spindle housings pivotally supported adjacent ends thereof on said base for movement about spaced parallel axes, means for applying equal bending loads to the adjacent ends of both of said housings, a spindle in each of said housings each having a conical seat and adapted for connection to opposite ends of a specimen, a draw bar in each spindle in threaded engagement with the specimen and terminating within the spindle, and holding means for holding each draw bar to a spindle, a pair of antifriction bearings located at opposite ends of each of said housings and supporting each of said spindles, said antifriction bearings being arranged in the transverse planes through the housings containing the points of pivotal support of the housings and the point of load application to the housings to eliminate housing deflection, and means including a flexible shaft integrally fixed to one of said holding means at a point closely adjacent the end of the housing for rotating the spindle in said housing.

2. A material testing machine comprising a base, a spindle housing supported on said base for pivotal movement about a transverse axis, a spindle in said housing and adapted to receive an end of a specimen, a draw bar having a threaded end adapted to be secured to the specimen, draw means accessible at one end of the spindle engaging with said draw bar and extending telescopically into and centered within the end of the spindle for holding the specimen in the spindle, a flexible drive shaft integrally connected to said draw means, load applying means on the housing, and a pair of antifriction bearings rotatably supporting the spindle in the housing, said antifriction bearings being centered in the same vertical planes which contain the pivot axis of the housing and the point of load application.

3. A material testing machine of the character described comprising a base, a spindle housing supported on said base for pivotal movement about a transverse axis adjacent one end thereof, means for applying a load to the other end of said housing, a hollow spindle rotatable in said housing and adapted for connection to one end of a specimen, a draw bar in the spindle and engaged at one end with the specimen and terminating at its other end within the spindle, a drive member removably engaging the draw bar and one end of the spindle to rotate the spindle and the specimen, said spindle having internal threads outwardly of the terminal end of the draw bar for the purpose described, and said drive member having a cylindrical surface projecting into and centered by said threads.

4. A material testing machine of the character described comprising a base, a spindle housing supported on said base for pivotal movement about a transverse axis, a spindle rotatable in said housing, antifriction bearings arranged closely adjacent opposite ends of said housing for supporting said spindle in said housing, means yieldingly positioning the antifriction bearings from the housing ends, load applying means on said housing, said bearings being arranged in the transverse planes through the housing which contain the points of pivotal support and load application of the housings, a draw bar adapted for detachable connection to a specimen and provided within the spindle, said draw bar terminating inside the spindle end, and a common drive member and draw nut engaging the end of the spindle and having a portion projecting telescopically into the end of the spindle and centered by the spindle and having internal threads in threaded engagement with the end of the draw bar.

5. A material testing machine comprising a base, a plurality of spindle housings pivotally supported on said base for movement about spaced parallel axes, means for applying a load to both of said housings, a spindle in each of said housings said spindles at their adjacent ends having means adapted to receive the opposite ends of a specimen, means accessible at the other ends of said spindles for securing the specimen to the spindles, and a pair of antifriction bearings for each of said spindles, said antifriction bearings being arranged substantially in the transverse planes through the housings containing the points of pivotal support of the housings and the points of load application to the housings, and means for balancing the weight of the housings effective at opposite sides of their pivotal axes to reduce the bending load on a specimen to zero.

RICHARD R. MOORE.